United States Patent [19] [11] 3,846,539
Renault et al. [45] Nov. 5, 1974

[54] PURIFICATION OF GAS CONTAINING SULFUR DIOXIDE OR SULFUR TRIOXIDE WITH THE PRODUCTION OF ELEMENTAL SULFUR

[75] Inventors: Philippe Renault, Noisy-le-Roi; Claude Dezael, Maisons-Laffitte; André Deschamps, Chatou, all of France

[73] Assignee: Institut Francais du Petrole, des Carburants et Lubrifiants, Rueil-Malmaison, France

[22] Filed: Oct. 10, 1972

[21] Appl. No.: 296,226

[30] Foreign Application Priority Data
Oct. 11, 1971 France .............................. 71.36555

[52] U.S. Cl................. 423/574, 423/232, 423/242, 422/428, 423/575
[51] Int. Cl. ...................... C01b 17/02, C01b 17/00
[58] Field of Search ............................ 423/242–244, 423/422, 428, 232, 233, 573, 574, 575

[56] References Cited
UNITED STATES PATENTS
1,807,583   6/1931   Bacon ................................. 423/574
3,285,711   11/1966  Stanford ......................... 423/242 X FOREIGN PATENTS OR APPLICATIONS
767,629   2/1957   Great Britain ...................... 423/422

Primary Examiner—Earl C. Thomas
Assistant Examiner—Gregory A. Heller
Attorney, Agent, or Firm—Millen, Raptes & White

[57] ABSTRACT

An industrial gas containing $SO_2$ or $H_2S$ is contacted with an aqueous solution of sodium carbonate and the resulting solution is reacted with ammonium hydrogen carbonate or with a mixture of $CO_2$ and $NH_3$. The resulting sodium hydrogen carbonate is converted to sodium carbonate and $CO_2$. $NH_3$ and $SO_2$ or $H_2S$ are also recovered and the latter are converted to sulfur.

21 Claims, 1 Drawing Figure

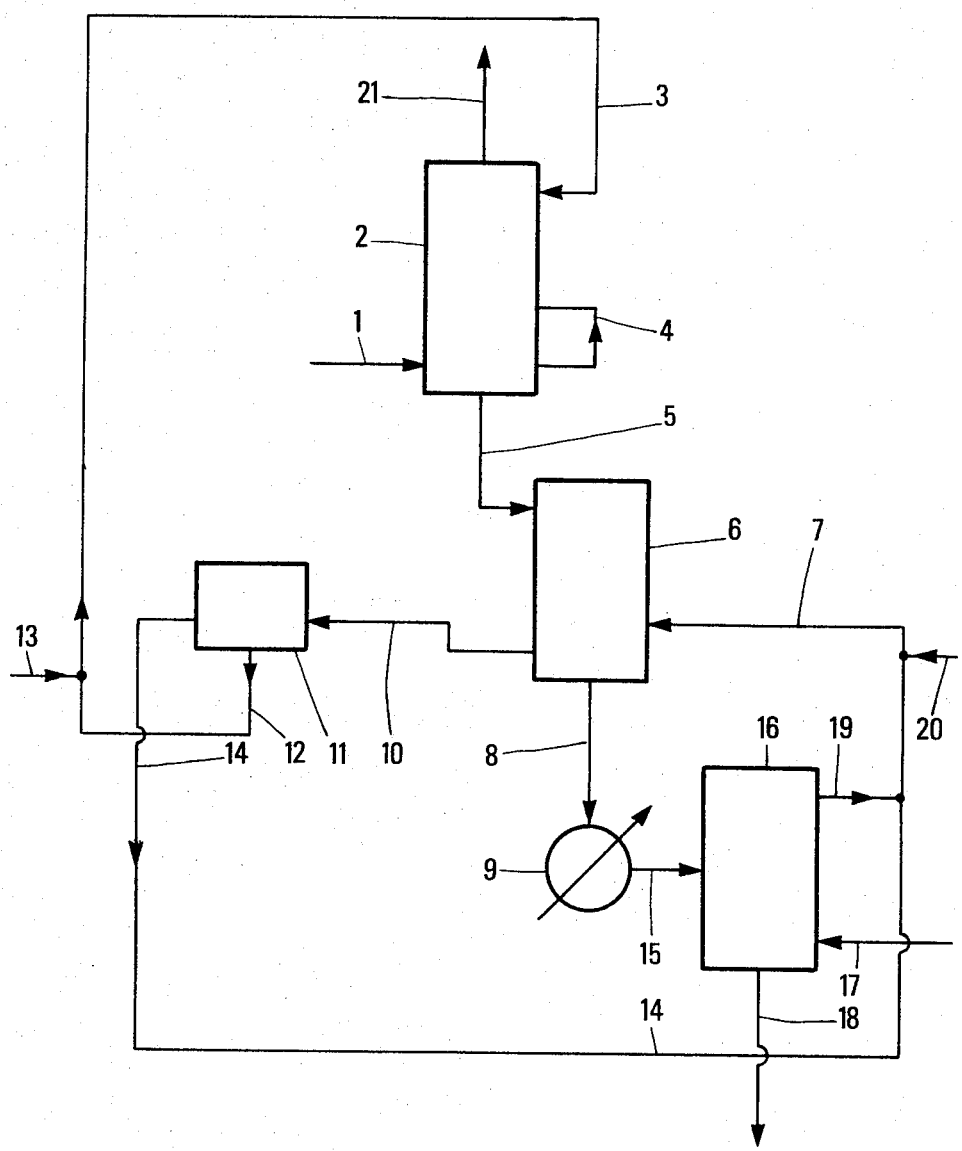

PURIFICATION OF GAS CONTAINING SULFUR DIOXIDE OR SULFUR TRIOXIDE WITH THE PRODUCTION OF ELEMENTAL SULFUR

The regenerative processes for purifying under wet conditions the flue gases containing sulfur dioxide, sulfur trioxide or hydrogen sulfide generally make use of ammonia solutions. The low basicity and the high volatility of ammonia do not always permit a thorough purification. Conversely, when using sodium hydroxide, neutral sodium sulfite or sodium carbonate, very high purification rates may be attained, but the resulting brines, which contain sodium sulfites, sulfates and optionally thiosulfates, or sodium sulfides when using hydrogen sulfide, cannot be easily regenerated.

This invention concerns the conversion of these sodium sulfites, sulfates, thiosulfates and sulfides to sodium carbonate and sulfur, the proceded sodium carbonate being optionally reused as absorption agent for the sulfur compounds contained in the flue gases.

According to the invention, ammonium hydrogen carbonate is added to the solutions of sodium sulfites, sulfates, thiosulfates or sulfides, thus resulting in the precipitation of sodium hydrogen carbonate which is separated and transformed by heating to sodium carbonate and carbon dioxide. The aqueous solution contains only the corresponding ammonium salts which, when treated with hydrogen sulfide or sulfur dioxide, depending on the case, for example, according to the process of the French Pat. No. 1,568,748, are converted to sulfur and ammonia. Another embodiment consists in thermally cracking these ammonium salts and reacting the resulting $SO_2$ or $H_2S$ with respectively hydrogen sulfide or sulfur dioxide, in the presence of a liquid phase. Ammonia and carbon dioxide are recovered during this step and used in the precipitation step.

The terms "sulfur dioxide" and "sulfur trioxide" are synonyms of "sulfurous anhydride" and "sulfuric anhydride," respectively, and are used as such in the specification and claims.

A first step of the process consists of absorbing sulfurous anhydride, sulfuric anhydride or hydrogen sulfide contained in an industrial gas by means of a sodium carbonate solution optionally containing sodium hydroxide, at a sodium concentration which may range, for example, from 0.1 to 4 mols per liter and is preferably about 2 mols per liter. The temperature is advantageously from 50 to 80°C, when working under atmospheric pressure, and is preferably close to the dew point of the gas. This step results in the recovery of brines containing sodium sulfites and/or sulfates when working with combustion fumes containing $SO_2$; in certain cases, sodium thiosulfate may also be present. When treating $H_2S$ containing gases, the brines contain sodium sulfides; the latter gases are more efficiently treated with a mixture of sodium hydroxide and $Na_2CO_3$.

In a second step, the brine resulting from the first step is contacted with ammonium hydrogen carbonate in a reaction vessel, at a relatively low temperature, preferably in the range of from 0° to 50°c and usually close to 40°C: the residual aqueous solution then contains ammonium salts. When treating a sulfite brine, the $SO_2$ and/or $SO_3$ concentration is, for example, between 0.2 and 3 moles per liter and the $NH_3$ concentration, for example, between 0.5 and 4 moles per liter, usually between 1 and 4 moles per liter. This precipitation may also be achieved by bubbling gaseous $CO_2$ and $NH_3$ through the ammonium salt brine.

Sodium hydrogen carbonate is formed, which, under the prevailing conditions, precipitates in a major part. It is separated, for example, by filtration or centrifugation.

The pressure in the second step reactor may be, for example, close to the atmospheric pressure if the precipitation agent is ammonium hydrogen carbonate, but it may be higher than the atmospheric pressure when a $CO_2$ and $NH_3$ containing gas is available. It may be, for example, as high as 20 atmospheres but it is preferably in the range of about 1 to 2 atmospheres.

The third step of the process consists in treating the solution from the second step with $H_2S$, if a sulfite brine is concerned, or with $SO_2$ if it contains sulfides, so as to produce elemental sulfur, which is removed, and to recover free ammonia. The temperature, in the step, is for example 90°–170°c and a liquid material, for example a glycol, may be present. Instead of a glycol, there may be used, for example, a glycol ester or ether, a polyalkylene glycol, a polyalkylene ether or ester, a heavy alcohol, a phosphoric ester, N-methyl pyrrolidone or melted sulfur. Catalysts for the reaction of $SO_2$ with $H_2S$ may be used, when desired. Hydrogen sulfide may be produced by reacting sulfur with hydrogen or it may be recovered from units for washing refinery gas or natural gas with amines. $SO_2$ may result, for example, from burning sulfur or sulfur compounds.

Instead of treating ammonium sulfites, sulfates or sulfides in the third step, their thermal decomposition products may be used, i.e., a mixture of sulfurous anhydride and/or sulfuric anhydride or $H_2S$ with ammonia.

On the other hand, sodium hydrogen carbonate, as produced in the second step, is heated in an oven up to a temperature of, for example, 120°–200°c and preferably about 150°c, to be converted to sodium neutral carbonate ($Na_2CO_3$) and carbon dioxide gas. The carbonate may be reused to absorb sulfurous anhydride and/or sulfuric anhydride or $H_2S$ from the industrial flue gases. The second step carbon dioxide may be reacted with ammonia and steam liberated in the third step to regenerate ammonium hydrogen carbonate used in the second step.

It is usually necessary to supply additional $CO_2$ so as to operate the process in conformity with the stoichiometry of the reaction. This additional $CO_2$ may consist of the $CO_2$ liberated in the first step or of the purified fume. As shown hereinbefore, it is not necessary to react $CO_2$ with $NH_3$ and their mere mixture may be recycled to the second step.

The reactions which take place in the above steps are the following:

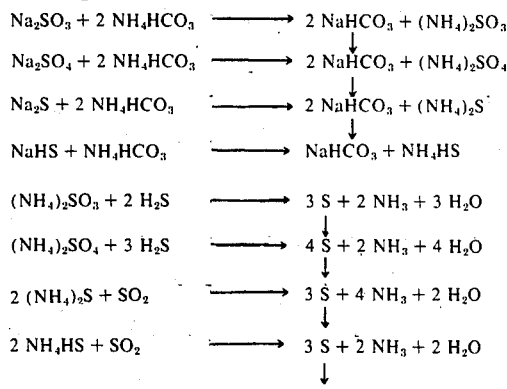

When the industrial brines contain sodium thiosulfate, in addition to sodium sulfite and/or sulfate, the proposed treatment also applies. The residual aqueous solution of the second step contains ammonium thiosulfate which may be treated with hydrogen sulfide in the presence of a solvent to produce sulfur and ammonia.

The reactions which take place in that case are the following:

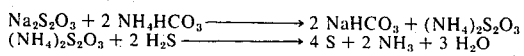

$$Na_2S_2O_3 + 2\ NH_4HCO_3 \longrightarrow 2\ NaHCO_3 + (NH_4)_2S_2O_3$$
$$(NH_4)_2S_2O_3 + 2\ H_2S \longrightarrow 4\ S + 2\ NH_3 + 3\ H_2O$$

The invention may be further illustrated by the accompanying drawing, given by way of example.

A fume to be purified, containing for example 0.2 percent of $SO_2$, is fed through pipe 1 to the absorption zone 2. The absorbing sodium carbonate aqueous solution, introduced from line 3, is recycled to the absorption zone through pipe 4; the temperature is about 60°c. The enriched sodium neutral sulfite solution is withdrawn through pipe 5 and introduced into the reaction vessel 6. A mixture of ammonia and carbon dioxide gas is introduced through pipe 7 into the reactor and bubbles therethrough.

The temperature is, for example, 35°c and the pressure, for example, 2 atmospheres. The sodium hydrogen carbonate precipitates; a filtrate is withdrawn through pipe 8 and vaporized in 9. The sodium hydrogen carbonate is passed through pipe 10 to the oven 11 where it is dried and heated.

The sodium carbonate resulting from this operation is recovered in 12, dissolved into water introduced from 13 and fed back through pipe 3 to the absorption zone. $CO_2$ escapes through pipe 14. The vapors produced by vaporizing the filtrate from reactor 6 are withdrawn through pipe 15. They essentially contain $SO_2$, $NH_3$ and water. They are introduced into a reactor 16 containing, for example, polyethylene glycol of an average molecular weight of 400 having 1 percent by weight of potassium benzoate added thereto and maintained at a temperature of, for example, 160°c, where they are contacted with $H_2S$ from line 17. The resulting sulfur is withdrawn through line 18 and ammonia and steam are withdrawn through line 19 and meet $CO_2$ of line 14. The mixture of $CO_2$ and $NH_3$ of line 7 feeding the reactor 6 is thus regenerated. Additional $CO_2$ is admitted from pipe 20. The treated fumes are withdrawn from the absorption zone through stack 21.

The following non-limitative examples illustrate the process of this invention:

EXAMPLE 1

A brine obtained from industrial wastes, containing $Na_2SO_3$ and $Na_2SO_4$ in the respective proportions of 1.5 mole/liter and 0.7 mole/liter, is introduced into a reactor maintained at atmospheric pressure and a temperature of 30°c. It is treated therein by a mixture of $CO_2$, $NH_3$ and $H_2O$. The formed $NaHCO_3$ precipitate is separated by filtration and calcined in an oven to produce $Na_2CO_3$ with a $CO_2$ release. $Na_2CO_3$ may be reused. $CO_2$ escapes and is fed back to the reactor.

A liquor also withdrawn from the reactor is fed to a vaporizer. The volatile elements vaporize and the hourly gas affluent contains:

| | |
|---|---|
| $SO_2$ | : 1.5 mole |
| $NH_3$ | : 4.4 mole |
| $CO_2$ | : 1.3 mole |
| $H_2O$ | : 8 mole |

A liquid outflow essentially containing $Na_2SO_4$ and water is recovered from the bottom of the vaporizer; it is rejected.

The gas outflow is treated at 130°c with hydrogen sulfide, in the presence of an organic solvent, for example, polyethylene glycol of an average molecular weight of 400. Sulfur is formed and separated. The resulting vapor escapes from the top; its average molar composition is:

| | |
|---|---|
| $CO_2$ | 8 % |
| $H_2O$ | 64 % |
| $NH_3$ | 28 % |

It is fed back to the reactor.

EXAMPLE 2

A brine obtained by absorption of the $H_2S$, contained in an industrial gas, by means of an aqueous solution of $Na_2CO_3$ and containing 1 mole/liter of NaHS and 1.3 mole/liter of $NaHCO_3$ is introduced into a reactor. The latter is maintained at 35°c under atmospheric pressure. A mixture of $CO_2$, $NH_3$ and $H_2O$ is also admitted therein. A precipitate of $NaHCO_3$ is formed, separated ans transferred into an oven for calcination thereof. The liquid effluent from the reactor is introduced into a vaporizer maintained at 110°c. There are obtained, on the one hand, water and $Na_2CO_3$ which are recovered and, on the other hand, an hourly gas flow containing:

| | |
|---|---|
| $H_2S$ | : 1 mole |
| $NH_3$ | : 1 mole |
| $H_2O$ | : 15 moles |
| $CO_2$ | : 0.65 mole |

This gas is then treated at 130°c, in the presence of polyethylene glycol, with a gas feed obtained by burning sulfur and containing $SO_2$ and nitrogen. The resulting sulfur is collected.

The resulting vapor is conveyed to a condenser to remove nitrogen therefrom. The molar composition is:

| | |
|---|---|
| $NH_3$ | : 5.4 % |
| $H_2O$ | : 91.1 % |
| $CO_2$ | : 3.5 % |

It is fed back to the reactor.

EXAMPLE 3

A sulfite brine consisting of an equimolecular mixture of sodium hydrogen and neutral sulfites is contacted with $H_2S$ at 60°c under atmospheric pressure, so as to transform all the sulfites to ammonium thiosulfate.

The resulting aqueous solution is concentrated up to 475 g of thiosulfate per liter. Then it is introduced into a stirred tank together with a mixture of ammonia and carbon dioxide gas. A pressure of 2 atmospheres is applied therein. The sodium hydrogen carbonate precipitates. It is separated and heated to obtain sodium neutral carbonate and $CO_2$. The resulting solution is vaporized and the gas effluent is treated with $H_2S$ at 150°c in a reactor containing polyethylene glycol of a molecular weight of 400. The resulting sulfur is withdrawn, and ammonia and steam which escape together with the $CO_2$ produced by calcination of $NaHCO_3$ are reutilized to treat the thiosulfate solution.

What we claim is:

1. A process for purifying a sulfur dioxide containing gas by means of an aqueous solution of sodium carbonate and with the production of elemental sulfur, comprising the steps of (a) contacting said gas with an aqueous solution of sodium carbonate so as to dissolve said sulfur dioxide in the form of sodium sulfite; (b) contacting the resulting solution with an aqueous solution of ammonium hydrogen carbonate or a gaseous mixture of carbon dioxide and ammonia so as to form a mixture of a sodium hydrogen carbonate precipitate and a liquid phase, separating said precipitate and heating it to form carbon dioxide and sodium carbonate, separating said carbon dioxide from said sodium carbonate, recycling said carbon dioxide to step (b) and said sodium carbonate to step (a); (c) reacting said liquid phase or its vaporization products with hydrogen sulfide to produce sulfur and release a $NH_3$ containing gas, separating the sulfur and recycling the $NH_3$ containing gas to step (b).

2. A process according to claim 1, wherein the step (a) is carried out at a temperature of from 50° to 80°C. and the step (b) at a temperature of from 0° to 50°C.

3. A process according to claim 1, wherein the $NH_3$ containing gas and the carbon dioxide are converted to ammonium hydrogen carbonate prior to being recycled to step (b).

4. A process according to claim 1, wherein additional carbon dioxide gas is supplied to step (b).

5. A process according to claim 1, wherein said sulfur dioxide containing gas also contains sulfuric anhydride.

6. A process according to claim 1, wherein said reacting of step (c) is carried out at 90°–170°C.

7. A process according to claim 1, wherein said liquid phase is reacted in step (c).

8. A process according to claim 1, wherein said vapor phase is reacted in step (c).

9. A process according to claim 1, wherein said gaseous mixture of carbon dioxide and ammonia is employed in step (b).

10. A process according to claim 6, wherein said reacting of step (c) is conducted with said vaporization products in contact with a member selected from the group consisting of a glycol, a glycol ester, a glycol ether, a polyalkylene glycol, a polyalkylene glycol ester, a polyalkylene glycol ether, a heavy alcohol, a phosphoric ester, N-methyl pyrrolidone and molten sulfur.

11. A process according to claim 1, wherein the resultant solution of sodium sulfite in step (a) is reacted with hydrogen sulfide before being subjected to step (b).

12. A process for purifying a hydrogen sulfide containing gas by means of an aqueous solution of sodium carbonate and with the production of elemental sulfur, comprising the steps of (a) contacting said gas with an aqueous solution of sodium carbonate so as to dissolve said hydrogen sulfide in the form of sodium sulfide; (b) contacting the resulting solution with an aqueous solution of ammonium hydrogen carbonate or a mixture or carbon dioxide and ammonia so as to form a mixture of a sodium hydrogen carbonate precipitate and a liquid phase, separating said precipitate and heating it to form carbon dioxide and sodium carbonate, separating said carbon dioxide from said sodium carbonate, recycling said carbon dioxide to step (b) and said sodium carbonate to step (a); (c) heating said liquid phase so as to release a gas containing $H_2S$ and $NH_3$ therefrom; (d) reacting said $H_2S$ and $NH_3$ containing gas with sulfur dioxide to produce sulfur and release a $NH_3$ containing gas, separating the sulfur and recycling the $NH_3$ containing gas to step (b).

13. A process according to claim 12, wherein the step (a) is carried out at a temperature of from 50° to 80°C. and the step (b) at a temperature of from 0° to 50°C.

14. A process according to claim 12, wherein the $NH_3$ containing gas and the carbon dioxide are converted to ammonium hydrogen carbonate prior to being recycled to step (b).

15. A process according to claim 12, wherein additional carbon dioxide gas is supplied to step (b).

16. A process according to claim 12, wherein said reacting of step (c) is carried out at 90°–170°C.

17. A process according to claim 12, wherein said liquid phase is reacted in step (c).

18. A process according to claim 12, wherein said vapor phase is reacted in step (c).

19. A process according to claim 12, wherein said gaseous mixture of carbon dioxide and ammonia is employed in step (b).

20. A process according to claim 16, wherein said reacting of step (c) is conducted with said vaporization products in contact with a member selected from the group consisting of a glycol, a glycol ester, a glycol ether, a polyalkylene glycol, a polyalkylene glycol ester, a polyalkylene glycol ether, a heavy alcohol, a phosphoric ester, N-methyl pyrrolidone and molten sulfur.

21. A process according to claim 12, wherein the aqueous sodium carbonate solution also contains sodium hydroxide.

* * * * *